United States Patent [19]

Uras et al.

[11] Patent Number: 5,437,197

[45] Date of Patent: Aug. 1, 1995

[54] MAGNETOSTRICTIVE SENSOR STRUCTURES

[75] Inventors: H. Mehmet Uras, Ann Arbor; Darrell K. Kleinke, Livonia, both of Mich.

[73] Assignee: The Board of Governors of Wayne State University, Detroit, Mich.

[21] Appl. No.: 109,840

[22] Filed: Aug. 20, 1993

[51] Int. Cl.⁶ .............................................. G01L 1/12
[52] U.S. Cl. ............................. 73/862.69; 73/DIG. 2
[58] Field of Search ............... 73/862.69, DIG. 2, 779; 324/209

[56] References Cited

U.S. PATENT DOCUMENTS

| | | | |
|---|---|---|---|
| 3,782,187 | 1/1974 | Dahle | 73/862.69 |
| 4,088,013 | 5/1978 | Dahle et al. | 73/779 |
| 4,138,783 | 2/1979 | Portier | 29/606 |
| 4,474,069 | 10/1984 | Blomkvist et al. | 73/862.69 |
| 4,495,821 | 1/1985 | Terhune | 73/753 |
| 4,561,314 | 12/1985 | Alley et al. | 73/862.69 |
| 4,802,368 | 2/1989 | Nordvall | 73/862.69 |
| 4,823,621 | 4/1989 | Sobel et al. | 73/862.69 |
| 4,825,709 | 5/1989 | Nordvall | 73/862.69 |
| 4,924,711 | 5/1990 | Reilly | 73/862.046 |
| 4,955,241 | 9/1990 | Schiessle et al. | 73/862.69 |
| 4,977,783 | 12/1990 | Pratt | 73/862.392 |
| 5,007,295 | 4/1991 | Gustafsson et al. | 73/862.69 |
| 5,166,613 | 11/1992 | Perry | 324/209 |
| 5,195,377 | 3/1993 | Garshelis | 73/862.69 X |

FOREIGN PATENT DOCUMENTS 0662828  5/1979  U.S.S.R. ............... 73/862.69

OTHER PUBLICATIONS

*New Types of Magnetoelastic Transducers for Sensing Force Related Parameters*, Garshells, Ivan J., SAE 910856, 1991, pp. 183–192.
*Magnetostrictive Torques Sensors–Comparison of Branch, Cross, and Solenoidal Designs*, Fleming, William J., SAE 900264, Feb. 26, 1990, pp. 51–78.
*Magnetic Properties of Mild Steel Under Conditions of Biaxial Stress*, Langman, Richard IEEE Transactions on Magnetics, vol. 26, No. 4, Jul. 1990, pp. 1246–1251.
*Magneto Strictive Torque Sensor Performance—Nonlinear Analysis*, Fleming, William J., IEEE Transactions on Vehicular Technology, vol. 38, No. 3, Aug. 1989, pp. 159–167.
*Non–Contact Sensor Measures Engine Torque*, Automotive Engineering, Jan. 1982, pp. 58–62.
*Magnetostrictive Torque Transducer*, Scoppe, F. E., Instrumentation Technology, Oct. 1969, pp. 95–99.
*Industrial Torque Measurment Using Magneto–Strictive Torquemeters*, Barton, Thomas H. et al., IEEE Transactions on Industrial and General Applications, Jul/Aug. 1967, pp. 310–314.
*A Precision Torquemeter Based on Magnetic Stress Anisotrophy*, Barton, T. H. et al., IEEE Transactions on Power Apparatus and Systems, Feb. 1966, pp. 152–159.

Primary Examiner—Richard E. Chilcot, Jr.
Assistant Examiner—Elizabeth L. Dougherty
Attorney, Agent, or Firm—Harness, Dickey & Pierce

[57] ABSTRACT

A magnetostrictive force sensor in which magnetically conductive support members are interposed between magnetically conductive end plates. The support members have magnetic properties which vary in accordance with the compressive or tensile load applied to them. The support members and end plates magnetically cooperate to create a magnetic circuit in which magnetic flux is induced by applying an alternating-current signal to a coil wound around one of the support members or by placing a permanent magnet into the magnetic circuit. When a load is applied to the magnetically conductive end plates, the magnetic properties of the support members vary to cause a change in the flux established in the magnetic circuit. The flux is detected by a second coil wound around the second support member, and the output signal detected by the detection coil is decoded to determine the load applied to the force sensor.

27 Claims, 4 Drawing Sheets

MAGNETOSTRICTIVE SENSOR STRUCTURES

BACKGROUND OF THE INVENTION

This apparatus is directed to a magnetostrictive force sensor and a magnetostrictive strain sensor in which a magnetic field in a closed loop magnetic circuit is generated, and at least one of the elements in the magnetic loop has magnetic properties responsive to changes in a load applied to that element.

Magnetostriction refers to stress or strain induced changes in magnetization, and has long been recognized. Bozorth determined that a tensile stress of 100 MPa (14.2 psi) increases the magnetic permeability of some materials by a factor of 100. Magnetostriction is measurable and may be applicable for sensing a number of different physical quantities. Physical properties measurable using magnetostriction include stress and strain in various mechanical configurations.

Conventional force sensors are modeled after electrical resistance type strain gages. In conventional force transducers, strain gages are installed on an elastic spring element subjected to the force to be measured. The spring element deflects under the force, and the magnitude of the strain changes. The strain gage is the sensing element, and it produces an electrical signal proportional to the measured force. Because strain gages are bonded to the spring element, the strains are transmitted directly to a very fine gage filament, causing a change in length and cross-sectional area, and thus, a change in resistance of the gage filament. Typically, the gage is incorporated into a Wheatstone bridge. Excitation circuitry energizes the bridge, and additional circuitry amplifies the electrical signal obtained from the bridge. The strain gage thus outputs a voltage proportional to the applied force.

Conventional force transducers of the strain gage configuration require precision machining of the spring element and proper installation of the gages. No reliable method exists to examine the bonding between the gage and the spring element, therefore, the bonding may deteriorate over time. Conventional force transducers also tend to be extremely delicate and require protection against mechanical damage. Furthermore, because the gages are bonded to the spring element, they possess a finite fatigue life and no overload protection. Such force transducers also require an excitation source and extensive signal conditioning because of the relatively low output voltages.

SUMMARY OF THE INVENTION

The magnetostrictive force sensors (MAFS) described herein address many of the limitations of the conventional force transducers. More particularly, the force sensors to be described herein are more sensitive, more durable, and have significantly greater structural integrity. The magnetostrictive family of sensors offers a broad range of applications including active suspensions and engine mounts for ground vehicles, active control of robots in manufacturing, active vibration control and monitoring, active control of buildings against seismic events, and active monitoring of bridges for truck overloads.

According to a first embodiment of the invention, a magnetic circuit having magnetically conductive end structures is operatively connected by magnetically conductive members. At least one of the magnetically conductive members is a strained element to which varying loads are applied. This strained element has magnetic properties which vary in accordance with the load applied to the strained element. When a load is applied to the strained element, the magnetic properties of the strain element vary, causing a magnetic flux induced in the magnetic circuit to vary. Magnetic flux is induced in the magnetic circuit by applying an alternating-current (A.C.) signal to an excitation coil in magnetic communication with the magnetic circuit. The flux of the magnetic circuit is detected by detection means in magnetic communication with the circuit. Such detection means may include a coil wound around one of the strained elements. The detected flux is decoded into the force applied to the strained element.

In an alternative embodiment, a magnetic field may be induced by placing a permanent magnet within the magnetic circuit or by applying a direct-current signal to the excitation coil, thereby inducing a constant flux. This results in a magnetostrictive dynamic force sensor. Such a sensor is responsive to the change in load applied to the conductive members. Changes in flux in the circuit vary in accordance with the change in applied load. The magnetostrictive dynamic force sensor is particularly useful in vibration measurement in engines, vehicle suspensions, and in load bearing members as may be found on a bridge.

Further objects, features and advantages of the invention will become apparent from a consideration of the following description and the appended claims when taken in connection with the accompanying drawings.

DETAILED DESCRIPTION OF THE EMBODIMENT

Figure 1:
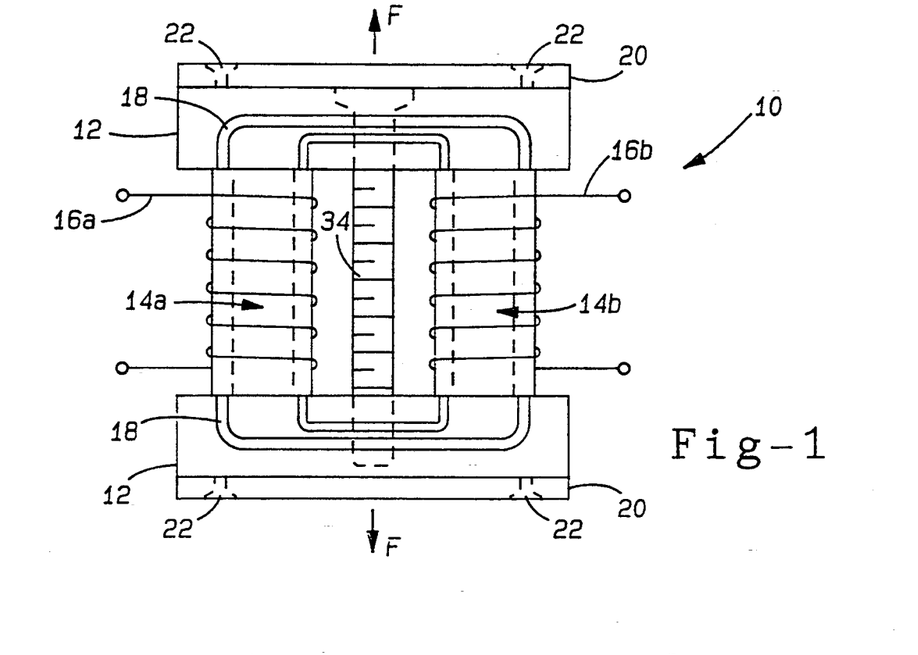
FIG. 1 depicts a first embodiment of a magnetostrictive sensor in which loads applied indirectly to magnetostrictive elements interposed between magnetically conductive end caps are measured.
Figure 2:
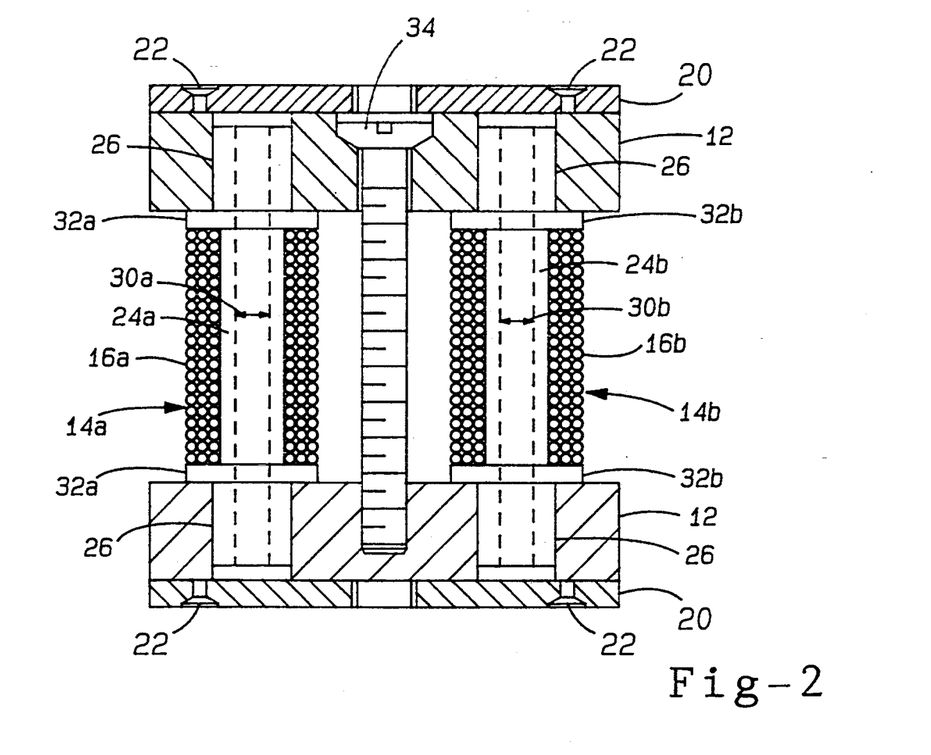
FIG. 2 is a partial cut-away view of FIG. 1 showing features of the magnetostrictive sensor elements.

FIGS. 1–2 generally depict a magnetostrictive force sensor 10. Force sensor 10 includes cores 14a–b, which comprise the magnetostrictive elements of the sensor 10, disposed between end plates 12. Excitation coil 16a is wound around core 14a, and upon the application of an alternating-current (A.C.) signal, induces magnetic flux through the magnetic loop formed by end plates 12 and cores 14a–b. Magnetic flux is indicated by flux lines 18. Detection coil 16b is wound around core 14b and the signal detected by coil 16b indicates the flux induced by the alternating-current signal applied to coil 16a. The sensed magnetic flux varies in accordance with the force F applied to the magnetostrictive sensor, which may be compressive or tensile. Mounting screws 22 attach insulative end caps 20 to magnetically conductive end plates 12. Insulative end caps 20 are a magnetically nonpermeable material such as aluminum and provide a mechanism for applying a load to the magnetostrictive sensor.

Referring to FIG. 2, a cut-away view of magnetostrictive sensor 10 depicts magnetostrictive elements 24a, 24b positioned within excitation coil winding 16a and detection coil winding 16b, respectively. Magnetostrictive elements 24a–b are preferably selected from a common material such as SAE 1018 steel. Although, any readily available material having appropriate magnetostrictive properties may be used as magnetostrictive elements 24a–b. Magnetostrictive elements 24a–b are tubular members insertably connected to magnetically conductive end caps 12.

Figure 3A:
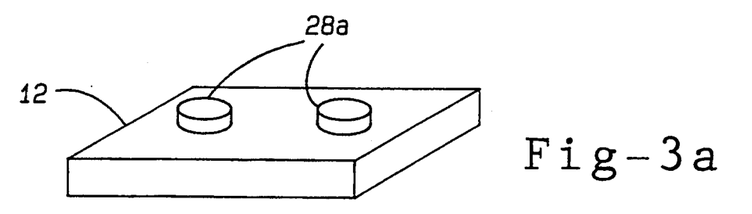
FIGS. 3a-c depict a number of alternative configurations for the end plate interconnection to the tubular members for retaining the tubular member and sensor core in a secure relation to the end plate.
Figure 3B:
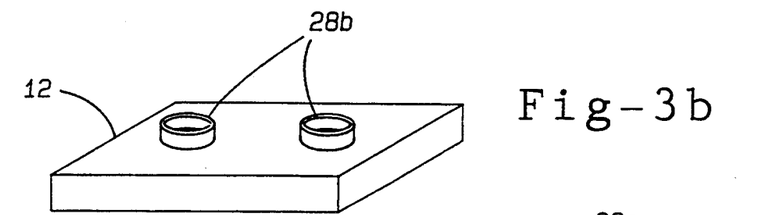
Figure 3C:
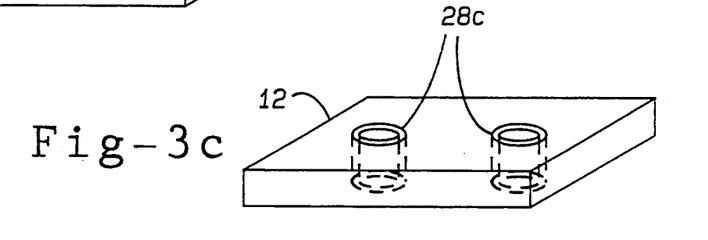

As shown in FIG. 2, bore holes 26 are receptive to tubular members 24a–b to secure tubular members 24a–b and surrounding cores 14a–b to the magnetically conductive end caps 12. As shown in FIGS. 3a–c, end plate 12 assumes one of a number of possible configurations suitable for receiving tubular members 24a–b. In FIG. 3a the interconnection between tubular member 24a–b may be a mesa 28a having a diameter substantially the same as the internal diameter 30a–b of tubular members 24a–b, respectively. In FIG. 3b magnetically conductive end cap 12 includes raised rims 28b which are either insertable into the inner diameter 30a–b of tubular members 24a–b or receptive to the outer diameter of tubular members 24a–b. FIG. 3c depicts yet another possible configuration for the interconnection between magnetically conductive end cap 12 and tubular members 24a–b. In FIG. 3c an annulus 28c is formed in magnetically conductive end cap 12 where the internal and external diameters of annulus 28c are substantially the same diameters as the internal and external diameters of tubular members 24a–b to effectuate a suitable connection. It should be noted that tubular members 24a–b and end plates 12 couple without the use of threaded interconnections. Threaded elements potentially introduce stresses which adversely affect the magnetostrictive effect of the material and are preferably avoided.

FIG. 2 also depicts a cutaway view of cores 14a–b, showing shoulder portions 32a–b between which are wound coil windings 16a–b, respectively. Coils 16a–b are embodied as identical coils having approximately 3,000 turns per coil with an access to each 500 turns. A fixed number of windings may be used in accordance with a particular application. In one experimental configuration, excitation coil 16a had 1,500 turns, and detection coil 16b had 1,000 turns. Tubular members 2.4a–b of the magnetostrictive force sensor 10 have internal diameters 30a–b which may be modified so that the load applied to the members 24a–b approaches the yield point of tubular members 24a–b when the force F approaches the maximum force to be measured in order to optimize magnetostrictive responsiveness. End plates 12 which connect to tubular members 24a–b are extremely rigid and possess a much larger cross sectional area than cores 14a–b. Consequently, tubular members 24a–b experience a significantly greater magnetostrictive effect than end plates 12. Thus, changes in magnetostrictive properties of the cores 14a–b contribute a substantially higher portion to the output of the sensor than end plates 12 whose contribution to the output of the sensor is substantially negligible.

Tubular members 24a–b also enable application flexibility in tuning the sensor for a specific force range. By substituting tubular members having different wall thicknesses, but identical height and outside diameter requirements, the sensor may be modified to measure a number of target forces. Impregnating excitation coil 16a and detection coil 16b with epoxy resin to impart a desired stiffness and shape facilitates substitution of varying tubular members 24a–b. During substitution, the windings 16a–b remain in place while a tubular members 24a–b tuned to the desired target force range are substituted.

Also shown in FIGS. 1 and 2 is assembly screw 34 which is typically a brass screw (magnetically nonpermeable) and possess a substantially lower modulus of elasticity than the steel employed in tubular members 24a–b. Assembly screw 34 thus has a negligible affect on the magnetic circuit because of its magnetic nonpermeability. Assembly screw 34 clamps end plates 12 between which are cores 14a–b and exerts a precompressive clamping force on tubular members 24a–b. The clamping force must be higher than the maximum expected tensile force to be measured because the clamping force on tubular members 24a–b decreases as the applied tensile force increases. When the applied force F is compressive, the compressive force on tubular members 24a–b increases. Because assembly screw 34 is comparatively low in stiffness with respect to tubular members 24a–b, the force distributed to assembly screw 34 is small compared to the force distributed to tubular members 24a–b. As the sensor is loaded, the strain in tubular members 24a–b and assembly screw 34 changes due to the exerted force. Assembly screw 34 yields an additional advantage in that tubular members 24a–b are maintained in compression. Because magnetostrictive material such as steel differs in sensitivity for compressive strains as compared to tensile strains, preloading tubular members 24a–b provides compensation for nonsymmetrical magnetostrictive behavior and fixes the sensor 10 output voltage in a linear range for a particular range of forces.

Figure 4A:
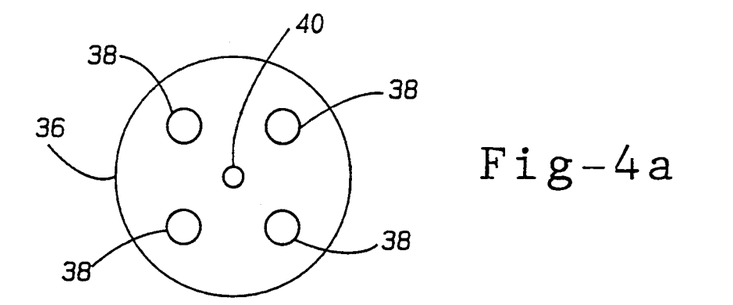
FIGS. 4a-b depict a number of alternative end plate configurations for accommodating more than two sensor core elements and more than one retaining screw.
Figure 4B:
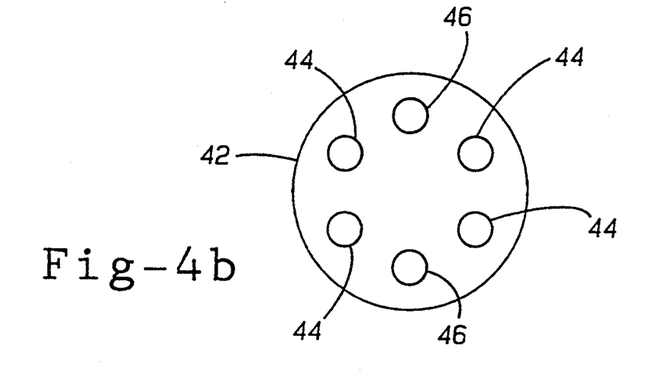

FIGS. 4a–b depict alternative configurations for end plates 12, allowing assembly of more than two core assemblies into a magnetostrictive sensor. In FIG. 4a, four core assemblies may be maintained in engagement with mounting plate 36 at locations 38. Compressive force may be applied via a bolt (not shown) through mounting hole 40. In FIG. 4b, end plates 12 may have a configuration in which plates 42 accommodate four core assemblies at locations 44. Two assembly screws (not shown) maintain mounting plates 42 in engagement with the core assemblies via assembly screw holes 46.

Tubular members placed equilaterally about magnetostrictive conductive end plates as shown in FIGS. 4a–b enable measurement of bending and transverse forces orthoganal to the principal axis of the tube as well as normal forces. Separate windings on each tube will thus allow measurement of side loading. Furthermore, by applying methods known in the art, temperature compensation may be effectuated using three or more strained elements.

In an alternative embodiment using the sensor configuration depicted in FIGS. 1–2, a direct-current (D.C.) excitation signal may be applied to excitation coil 16a to produce a constant flux. The D.C. signal applied to excitation coil 16a generates a constant magnetic flux within the magnetic circuit. A constant magnetic flux in the magnetic circuit enables the determination of variations in the load applied to magnetostrictive sensor 10, such modification yielding a magnetostrictive dynamic force sensor. Detection coil 16b detects a signal generated by changing the magnetic flux resulting from application of the change of force. A change in the load applied to magnetostrictive sensor 10 produces a change in the signal detected by detection coil 16b. This change in the signal varies in accordance with the change in the applied load.

Figure 5:
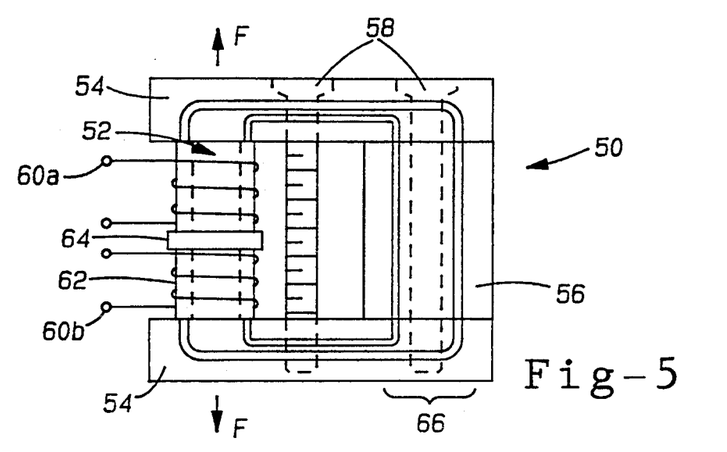
FIG. 5 depicts a second embodiment of the magnetostrictive sensor in which both the sensor and detector windings are positioned around a single sensor core.

FIG. 5 depicts an alternative embodiment for a magnetostrictive sensor 50. In this embodiment only one core 52 is positioned between end plates 54. Opposite core 52, a magnetically permeable element functions as a support member 56 and completes the magnetic current loop so that a magnetic flux may be generated. One or (optionally) two brass assembly screws 58 compressively preload core 52 between magnetically conductive end caps 54. Excitation coil 60a and detection coil 60b are wound around core 52. Magnetically nonpermeable barrier 64 separates coils 60a and 60b and comprises a material such as aluminum. In this manner, one of the core assemblies may be eliminated and a more compact, inexpensive sensor may be achieved. The operation of this sensor is as described with respect to FIGS. 1 and 2. A tubular member (not shown) located internally to core 52 is comprised of a magnetostrictive material responsive to an applied load F as described with respect to tubular members 24a–b of FIG. 2. The magnetic properties of the tubular member change to vary the voltage (or current) output as detected by detector coil 60b. It should be noted that core 52 must carry a substantial majority of the applied force F.

Figure 6A:
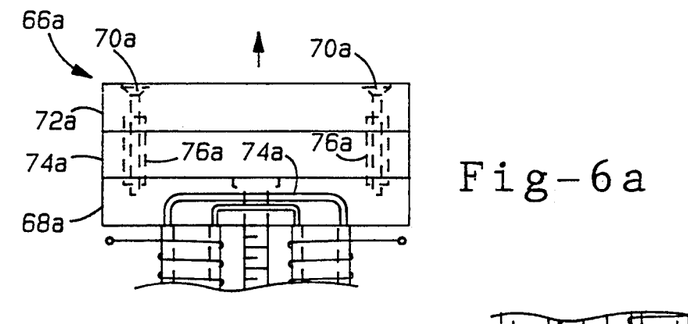
FIGS. 6a-b depict two alternative configurations for improving the magnetic flux flow through the magnetic circuit loop.
Figures 6B, 7:
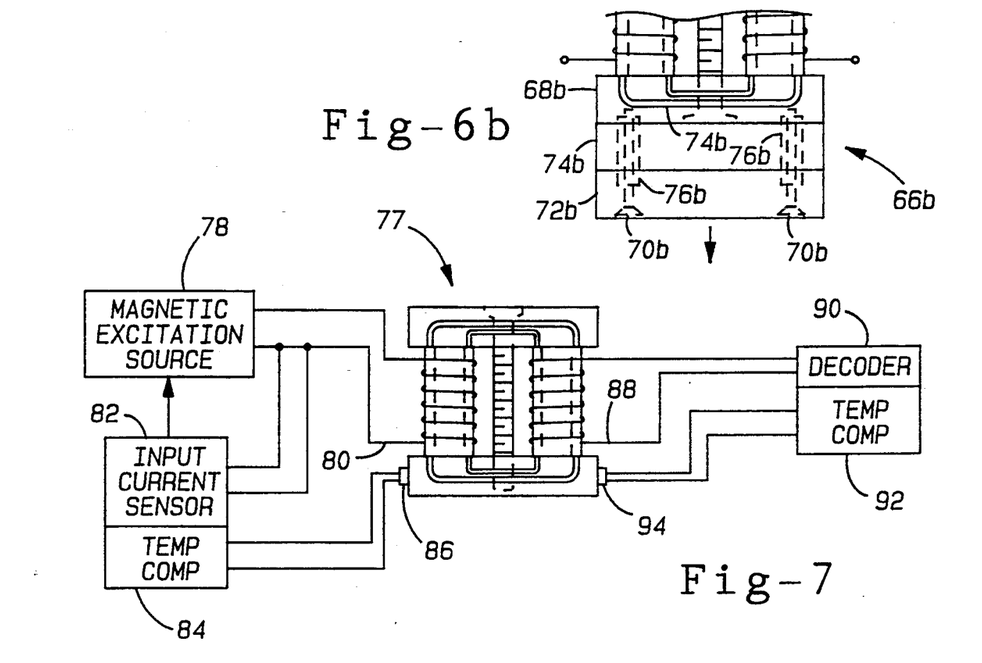
FIG. 7 depicts an electronic circuit which generates a magnetic field in the magnetic circuit loop and determines the load applied to the sensor elements using decoder circuitry.

In the magnetostrictive sensor described herein, it is desirable to limit flux path interference introduced by magnetically nonpermeable material. This increases the flux and, consequently, increases the induced and detected voltages. FIGS. 6a–b depict two additional alternative embodiments of a magnetostrictive sensor 66a–b in which aluminum mounting plate 20 and the position of mounting plate screws 22 of FIGS. 1–2 have been modified to reduce the magnetically nonpermeable material interposed in the flux path. With respect to FIGS. 6a–b, it should be noted that the portions of the magnetic circuit not described herein are as described previously with respect to FIGS. 1–5. That is, a core portion, the accompanying tubular members, the excitation coil, the detection coil, and the brass assembly screws are as described with respect to FIGS. 1–2. The mounting plate material is also as described with respect to FIGS. 1 and 2 but, to be further described herein, has different dimensions than the aluminum mounting plates 20 of FIGS. 1–2.

In FIG. 6a, the width of magnetically conductive end plate 68a is extended as is the width of aluminum mounting plate 72a, and an insulative layer 74a has been interposed between magnetically conductive end plate 68a and aluminum mounting plate 72a. Extending the width of these plates and interposing an insulative layer 74a serves two purposes. First, a wider end plate 68a enables the positioning of brass assembly screws 70a further from flux lines 74a so that a minimum of magnetically nonconductive material is interposed in the path of the flux lines 74a. Second, insulative layer 72a provides electrical isolation between magnetically conductive end plate 68a and aluminum mounting plate 72a. This improves both the output and the sensitivity of the magnetostrictive sensor. FIG. 6a also shows assembly screws 70a coated with a covering of teflon tape 76a in order to minimize the electrical conductance of mounting screws 70a between end plate 68a and aluminum mounting plate 72a. FIG. 6b depicts a similar arrangement for reducing the magnetically conductive material interposed into flux lines 74b. In FIG. 6b, the thickness of magnetically conductive end plate 68b, aluminum mounting plate 72b and insulative layer 74b has been increased along the axial direction with respect to core members in order to increase the separation distance between mounting screws 70b and flux lines 74b. Also included in FIG. 6b is teflon tape 76b, providing electrical isolation between conductive end plate 68b and aluminum mounting plate 72b.

In general, there are a number of circuits known in the art for providing an excitation signal to an excitation coil and for detecting an output signal from a sensor coil. One electrical circuit for generating input signals and decoding output signals for the magnetostrictive sensors described herein is depicted in FIG. 7. Magnetostrictive sensor 77 is generally as described above and is electrically connected to excitation and decoding circuitry to induce and sense magnetic flux. A source of magnetic excitation 78, which may be an alternating-current signal, is applied to the input terminals of excitation coil 80, thereby inducing a magnetic flux in the magnetostrictive sensor 77. An excitation signal in the range of 2 to 20 volts at a frequency of 1 to 10 KiloHertz (KHz) is sufficient to activate the sensor. In the circuit shown in FIG. 7, input current sensor 82 controls magnetic excitation source 78 by sensing the current across the excitation coil 80. Input current sensor 82 may be temperature compensated via temperature compensation circuit 84 whose input originates from temperature sensing element 86. Detection coil 88 detects the output signal of magnetostrictive sensor 77. Output terminals of detection coil 88 connect to decoder 90 which determines the load applied to magnetostrictive sensor 77 in accordance with change in magnetostrictive properties in the sensor 77. Temperature compensation of the detected signal may occur via temperature compensation circuit 92 obtaining an input signal from temperature sensing element 94, or other appropriate temperature sensing means, located in proximity to detection coil 88.

Changes in the magnetostrictive properties of magnetostrictive sensor 77 are detected using a number of electrical excitation and detection methods. For example, adjusting the excitation voltage enables control of the excitation current or detection voltage. On the other hand, by holding the excitation current constant, the change in the detection voltage indicates a change in the applied force. Alternatively, a constant flux control mode is implemented by holding the detection voltage constant as the measured force varies. Changes in the excitation current indicate the applied force.

Figures 8, 9:
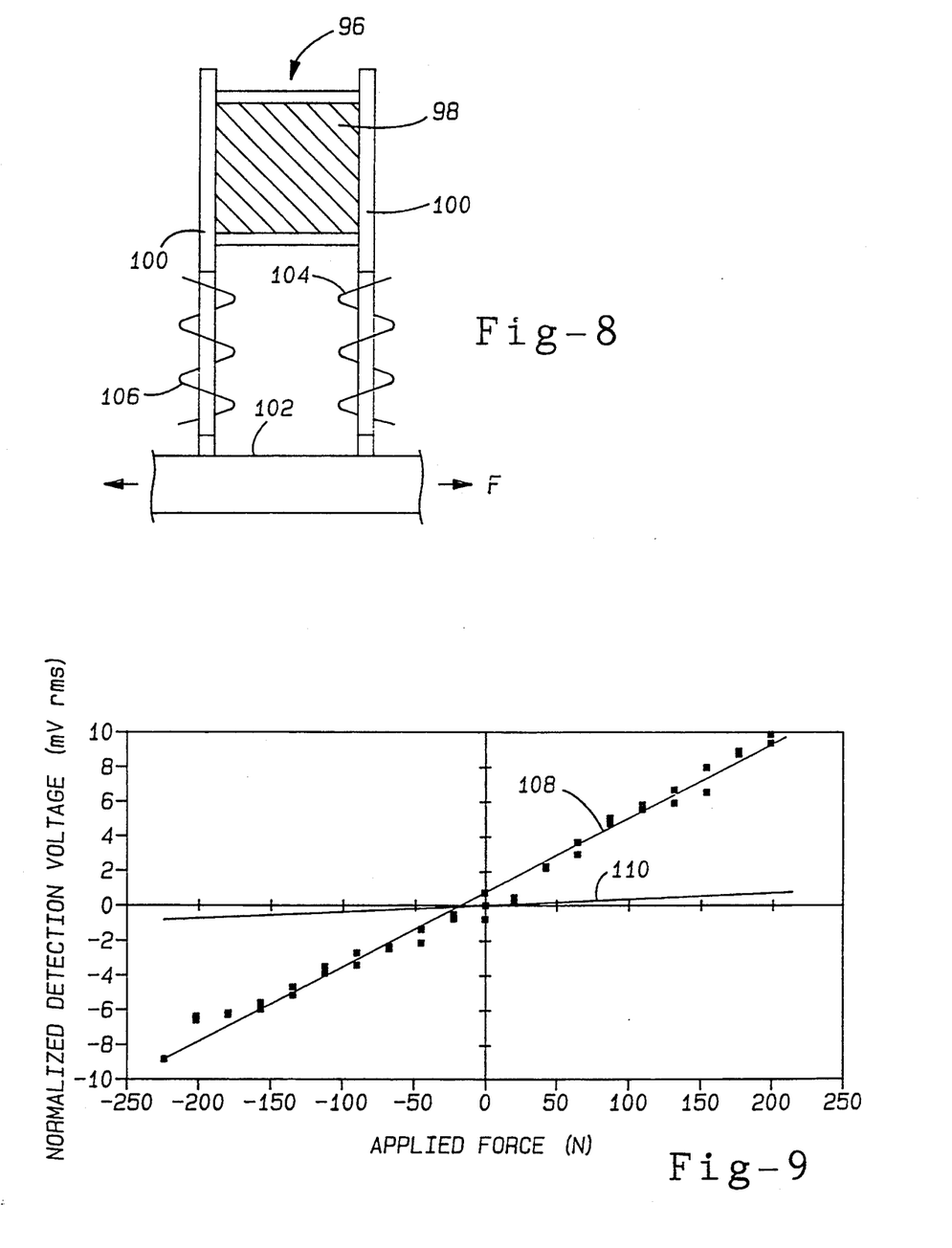
FIG. 8 depicts a third embodiment of the magnetostrictive sensor in which a permanent magnet provides a magnetic field flow and a detection coil detects a change in the magnetic field in order to determine a change in the load applied to the magnetostrictive material.
FIG. 9 depicts a graphical representation of the output of a magnetostrictive force sensor and the output of a strain sensor.

FIG. 8 depicts an additional embodiment of magnetostrictive force sensor 96 for measuring strain in a particular element. The sensor includes a permanent magnet 98 as a source of magnetic flux interposed between two magnetically conducting members 100. Because the permanent magnet 98 provides a source of magnetic flux, an excitation coil is unnecessary. The permanent magnet may be of any conventional type or be a high output magnet such as solarium cobalt. When the sensor members 100 are brought into contact with a ferro-magnetic target material 102, a constant flux flows through the target material and completes a magnetic circuit loop. The ferro-magnetic target material 102 may be any of a number of shapes such as a solid bar, an I-beam, or a rectangular tube. As the force F causes a change in strain in the target material changes over time, magnetic flux changes due to the magnetostrictive properties of the material, and a voltage is produced in accordance with Faraday's law. Detection coil 104 detects the change in flux, which manifests itself in an output current. Note that only one detection coil 104 is necessary and that an excitation coil is unnecessary because permanent magnet 98 provides the magnetic flux. An optional second coil 106 may be provided as a second detection coil to increase the sensitivity of the strain sensor. The sensor described with respect to FIG. 8 responds to dynamic strains only, and its output also depends on the frequency of the strain changes. Such an apparatus is particularly useful as a vibration detector for any number of applications such as vehicle suspension systems or any other magnetostrictive vehicle component, bridge suspension member analysis, or building frame analysis. A sensor of this type may be generally referred to as a magnetostrictive dynamic strain sensor because a change in force results in an output.

The force sensitivity of the magnetostrictive force sensor in comparison to a strain gage based sensor is demonstrated in FIG. 9. Line 108 represents the force sensitivity in terms of normalized detection voltage versus applied force for a magnetostrictive force sensor, while waveform 110 represents the force sensitivity for a strain gage based sensor. It can be seen from the waveforms in FIG. 9 that the force sensitivity of the magnetostrictive force sensor is significantly higher than for the strain gage. In effect, the apparatus presented herein is a simple, rugged, and inexpensive force sensor having significantly fewer associated design considerations such as overload protection, mechanical protection, and bonding considerations that typically accompany strain gage based force sensors. An added benefit is that the size requirements of the magnetostrictive sensor systems described herein are significantly less than those of conventional strain gage systems.

It is to be understood that the invention is not limited to the exact construction illustrated and described above, but that various changes and modifications may be made without departing from the spirit and scope of the invention as defined in the following claims.

We claim:

1. A magnetostrictive force sensor comprising:
a magnetic circuit having magnetically conductive end structures connected by magnetically conductive members, at least one of the magnetically conductive members being a strained element within the magnetic circuit, the strained element having magnetic properties which vary in accordance with a load applied to the strained element;
means for inducing a magnetic field in the magnetic circuit;
means for sensing a magnetic field within the magnetic circuit; and
means for compressing the strained element to preload the strained element and initiate a magnetostrictive response in the strained element.

2. The apparatus as defined in claim 1 further comprising means for retaining the strained element in position in relation to the magnetically conductive end structures.

3. The apparatus as defined in claim 1 further comprising a decoding means for determining the force applied to the magnetically conductive end structures in accordance with the magnetic field sensed by the magnetic field sensing means.

4. The apparatus as defined in claim 1 wherein the means for inducing a magnetic field comprises a coil in magnetic communication with the magnetic circuit, the coil inducing the magnetic field in the magnetic circuit in response to an alternating-current signal.

5. The apparatus as defined in claim 1 wherein one of the end structures includes a permanent magnet, the permanent magnet inducing the magnetic field in the magnetic circuit, and variations in the magnetic field detected by the magnetic field sensing means indicate a change in force applied to said magnetostrictive force sensor.

6. The apparatus as defined in claim 1 wherein the strained element is preloaded in accordance with a projected load to be measured by the strained element.

7. A magnetostrictive force sensor comprising:
a magnetic circuit having magnetically conductive end structures connected by magnetically conductive members, at least one of the magnetically conductive members being a strained element within the magnetic circuit, the strained element having magnetic properties which vary in accordance with a load applied to the strained element;
means for inducing a magnetic field in the magnetic circuit;
means for sensing a magnetic field within the magnetic circuit;
means for compressing the strained element to preload the strained element and initiate a magnetostrictive response in the strained element; and
a decoding means for determining the force applied to the magnetically conductive end structures in accordance with the magnetic field sensed by the magnetic field sensing means.

8. The apparatus as defined in claim 7 further comprising means for retaining the strained element in position in relation to the magnetically conductive end structures.

9. The apparatus as defined in claim 7 wherein the means for inducing a magnetic field further comprises a coil in magnetic communication with the magnetic circuit, the coil inducing the magnetic field in the magnetic circuit in response to an alternating-current signal.

10. The apparatus as defined in claim 7 wherein one of the end structures includes a permanent magnet, the permanent magnet inducing the magnetic field in the magnetic circuit, and variations in the magnetic field detected by the magnetic field sensing means indicate a change in force applied to said magnetostrictive force sensor.

11. The apparatus as defined in claim 7 wherein the strained element is preloaded in accordance with a projected load to be measured by the strained element.

12. A magnetostrictive force sensor comprising:
a magnetic circuit having magnetically conductive end structures connected by magnetically conductive members, at least one of the magnetically conductive members being a strained element within the magnetic circuit, the strained element having magnetic properties which vary in accordance with a load applied to the strained element;
means for compressing the strained element to preload the strained element and initiate a magnetostrictive response in the strained element; and
means for retaining the strained element in position in relation to the magnetically conductive end structures.

13. The apparatus as defined in claim 12 further comprising means for inducing a magnetic field in the magnetic circuit.

14. The apparatus as defined in claim 13 further comprising means for sensing a magnetic field in the magnetic circuit.

15. The apparatus as defined in claim 14 wherein the means for inducing a magnetic field further comprises a decoding means for determining the force applied to the magnetically conductive end structures in accordance with the magnetic field sensed by the magnetic field sensing means.

16. The apparatus as defined in claim 14 wherein the means for inducing a magnetic field further comprises a coil in magnetic communication with the magnetic circuit, the coil inducing the magnetic field in the magnetic circuit in response to an alternating-current signal.

17. The apparatus as defined in claim 14 wherein one of the end structures includes a permanent magnet, the permanent magnet inducing the magnetic field in the magnetic circuit and variations in the magnetic field detected by the magnetic field sensing means indicate a change in force applied to said magnetostrictive force sensor.

18. The apparatus as defined in claim 12 wherein the strained element is preloaded in accordance with a projected load to be measured by the strained element.

19. A magnetostrictive dynamic force sensor comprising:
a magnetic circuit having magnetically conductive end structures connected by magnetically conductive members, at least one of the magnetically conductive members being a strained element within the magnetic circuit, the strained element having magnetic properties which vary in accordance with a load applied to the strained element;
means for inducing a magnetic field in the magnetic circuit, the magnetic field remaining constant in accordance with a constant load applied to the strained element and varying in accordance with a variation in load applied to the strained element;
means for sensing a variation in the magnetic field within the magnetic circuit;
means for compressing the strained element to preload the strained element and initiate a magnetostrictive response in the strained element; and
a decoding means for determining a variation in load applied to the magnetically conductive end structures in accordance with the variation in the magnetic field sensed by the magnetic field sensing means.

20. The apparatus as defined in claim 19 wherein the means for inducing the magnetic field further comprises a permanent magnet interposed in the magnetic circuit.

21. The apparatus as defined in claim 19 wherein the strained element is preloaded in accordance with a projected load to be measured by the strained element.

22. A magnetostrictive dynamic strain sensor comprising:
a permanent magnet, for providing a source of magnetic flux, interposed between a pair of magnetically conductive support members, the magnetically conductive members being attachable to a target material; and
means for sensing a magnetic field within one of the magnetically conductive support members;
whereby the target material has magnetic properties which vary in accordance with a load applied to the target material and completes a magnetic circuit which includes the permanent magnet and the magnetically conductive support members, and the magnetic field sensed by the sensing means is constant in response to a constant load applied to said target material and varies in response to a variation in the load applied to the target material.

23. A magnetostrictive force sensor comprising:
a magnetic circuit having magnetically conductive end structures connected by magnetically conductive members, at least one of the magnetically conductive members being a strained element within the magnetic circuit, the strained element having magnetic properties which vary in accordance with a load applied to the strained element;
means for inducing a magnetic field in the magnetic circuit including a coil in magnetic communication with a magnetic circuit, the coil inducing the magnetic field in the magnetic circuit in response to a direct-current signal;
means for sensing a magnetic field within the magnetic circuit where variations in the magnetic field detected by the magnetic field sensing means indicate a change in force applied to said magnetostrictive force sensor; and
means for compressing the strained element to preload the strained element and initiate a magnetostrictive response in the strained element.

24. A magnetostrictive force sensor comprising:
a magnetic circuit having magnetically conductive end structures connected by magnetically conductive members, at least one of the magnetically conductive members being a strained element within the magnetic circuit, the strained element having magnetic properties which vary in accordance with a load applied to the strained element;
means for inducing a magnetic field in the magnetic circuit including a coil in magnetic communication with the magnetic circuit, the coil inducing the magnetic field in the magnetic circuit in response to a direct-current signal;
means for sensing a magnetic field within the magnetic circuit where variations in the magnetic field detected by the magnetic field sensing means indicate a change in force applied to said magnetostrictive force sensor;
means for compressing the strained element to preload the strained element and initiate a magnetostrictive response in the strained element; and
a decoding means for determining the force applied to the magnetically conductive end structures in accordance with the magnetic field sensed by the magnetic field sensing means.

25. A magnetostrictive force sensor comprising:

a magnetic circuit having magnetically conductive end structures operatively connected by magnetically conductive members, at least one of the magnetically conductive members being a strained element within the magnetic circuit, the strained element having magnetic properties which vary in accordance with a load applied to the strained element;

means for compressing the strained element to preload the strained element and initiate a magnetostrictive response in the strained element;

means for retaining the strained element in position in relation to the magnetically conductive end structures;

means for inducing a magnetic field in the magnetic circuit including a coil in magnetic communication with the magnetic circuit, the coil inducing the magnetic field in the magnetic circuit in response to a direct-current signal; and means for sensing a magnetic field in the magnetic circuit where variations in the magnetic field detected by the magnetic field sensing means indicate a change in force applied to said magnetostrictive force sensor.

26. A magnetostrictive dynamic force sensor comprising:

a magnetic circuit having magnetically conductive end structures connected by magnetically conductive members, at least one of the magnetically conductive members being a strained element within the magnetic circuit, the strained element having magnetic properties which vary in accordance with a lead applied to the strained element;

means for inducing a magnetic field in the magnetic circuit, the magnetic field remaining constant in accordance with a constant lead applied to the strained element and varying in accordance with a variation in lead applied to the strained element;

means for sensing a variation in the magnetic field within the magnetic circuit;

means for compressing the strained element to preload the strained element and initiate a magnetostrictive response in the strained element; and a decoding means for determining a variation in load applied to the magnetically conductive end structures in accordance with the variation in the magnetic field sensed by the magnetic field sensing means;

a coil in magnetic communication with the magnetic circuit; and a source of direct current voltage applied to the coil.

27. A magnetostrictive dynamic strain sensor comprising:

a permanent magnet, for providing a source of magnetic flux, interposed between a pair of magnetically conductive support members, the support members being in magnetic communication with a magnetically conductive target material, the target material having magnetic properties which vary in accordance with a load applied to the target material, the target material completing a magnetic circuit including the permanent magnet and the magnetically conductive support members; and a magnetic coil for sensing a magnetic field within one of the magnetically conductive support members, the magnetic field being constant in response to a constant load applied to said target material, and the magnetic field varying in response to a variation in the load applied to the target material.

* * * * *

UNITED STATES PATENT AND TRADEMARK OFFICE
CERTIFICATE OF CORRECTION

PATENT NO. : 5,437,197
DATED : August 1, 1995
INVENTOR(S) : H. Mehmet Uras et al.

It is certified that error appears in the above-indentified patent and that said Letters Patent is hereby corrected as shown below:

Column 4, line 2, replace "2.4" with --24--.

Column 11, line 37, claim 26, replace "lead" with --load--.
Column 12, line 3, claim 26, replace "lead" with --load--.
Column 12, line 5, claim 26, replace "lead" with --load--.

Signed and Sealed this

Twentieth Day of February, 1996

Attest:

Attesting Officer

BRUCE LEHMAN
Commissioner of Patents and Trademarks